United States Patent
Zoppi

[19]

[11] Patent Number: 6,136,059
[45] Date of Patent: Oct. 24, 2000

[54] PROCESS FOR REDUCING THE ELECTRIC STEELWORKS DUSTS AND FACILITY FOR IMPLEMENTING IT

[75] Inventor: Gianni Zoppi, Dino di Sonvico, Switzerland

[73] Assignee: Ecochem Aktiengesellschaft, Triesen, Liechtenstein

[21] Appl. No.: 08/961,989

[22] Filed: Oct. 31, 1997

[30] Foreign Application Priority Data

Nov. 1, 1996 [CH] Switzerland .............................. 2710/96

[51] Int. Cl.[7] .................................................. C21B 13/12
[52] U.S. Cl. ...................... 75/10.15; 75/10.38; 75/10.46
[58] Field of Search ............... 75/10.14, 10.15, 75/10.17, 10.38, 376, 10.46; 423/107

[56] References Cited

U.S. PATENT DOCUMENTS

| | | | |
|---|---|---|---|
| 3,908,072 | 9/1975 | Colin | 75/10.15 |
| 4,612,041 | 9/1986 | Matsuoka et al. | 75/10.14 |
| 4,762,554 | 8/1988 | Lazcano-Navarro . | |
| 4,802,919 | 2/1989 | Fey | 75/504 |
| 4,906,290 | 3/1990 | Worner | 75/10.13 |
| 5,540,751 | 7/1996 | Yamamoto et al. | 75/376 |

FOREIGN PATENT DOCUMENTS

| | | |
|---|---|---|
| 0 174 641 | 3/1986 | European Pat. Off. . |
| 3711353 | 4/1987 | Germany . |
| 37 11 353 | 10/1987 | Germany . |

OTHER PUBLICATIONS

Zunkel, D. What to do With Your EAF Dust, *Steel Times International*, vol. 20, No. 4, Jul. 1996; pp. 46, 48–50.
Derwent Abstract 87–300149/43 "Treating waste material to remove toxic compounds." Limpach, R. and Metz, P, Apr. 1986.

*Primary Examiner*—Roy V. King
*Assistant Examiner*—Tima McGuthry-Banks
*Attorney, Agent, or Firm*—Pillsbury Madison & Sutro

[57] ABSTRACT

A process for processing electric steelworks dusts containing oxidized high-iron, zinc-bearing materials in order to recover iron and zinc from [them] said dusts. The process includes the steps of: feeding the dusts to an induction furnace partially filled with a charge of metal or alloy to be smelted, wherein the charge is present as a molten bath that is made turbulent by induced currents; contacting the dusts with a surface of the turbulent molten bath inside the furnace; and reducing zinc and iron oxides contained in the dusts inside the furnace, while oxidizing zinc and carbon monoxide rising from the bath.

11 Claims, 1 Drawing Sheet

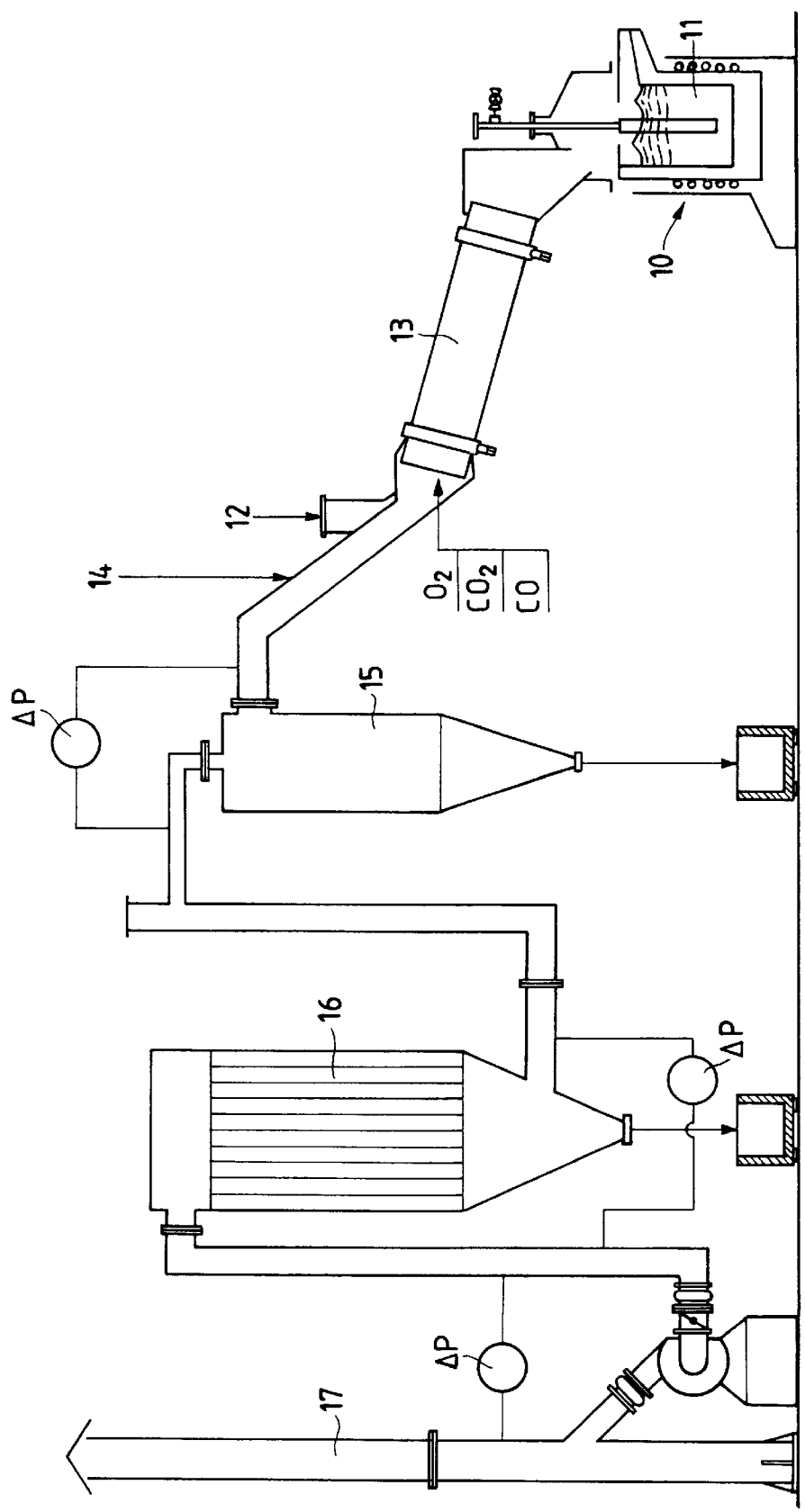

PROCESS FOR REDUCING THE ELECTRIC STEELWORKS DUSTS AND FACILITY FOR IMPLEMENTING IT

BACKGROUND OF THE INVENTION

The present invention relates to a process for processing electric steelworks dusts and zinc-bearing, high-iron, oxidized materials in a low-frequency induction furnace of a coreless type, resulting in:

reduction of contained iron oxides to cast iron,
concentration of non-ferrous metal oxides in fumes recovered from the process, and,
formation of slag suitable for disposal in normal dumps.

The cast iron bath is kept at a high temperature and is rapidly circulated by the induced currents which flow through it. This bath constitutes the "reducing section" of the furnace. The reduction of the oxides of metal which constitute the feed: Zn, Pb, Cd, Fe, takes place inside this bath.

The bath covering layer, occupied by the feedstock (pelletized steelworks dusts, granular coal, slagging agents), constitutes the oxidizing section of the furnace inside which coal is burnt yielding CO, and vapors of Zn and other feedstock metals leaving the bath are oxidized again and turn into fumes.

A proper fume collection unit collects the dusts and recovers Zn, Pb, Cd oxides concentrated to more than twice as high levels relatively to their initial concentrations at process beginning.

It is well-known that iron scrap smelting in electrical furnace causes 10–20 kg of dusts to be formed for each ton of produced steel. These light-weight, fine and easily dispersible dusts (referred to hereinafter as "EAF dusts") contain, as their oxides, 20–25% Fe, 18–25% Zn, 2–4% Pb, and still other, more or less dangerous impurities.

On considering the size of present steelworks, the amount of dusts produced is extremely large and, owing to health, environmental and economic reasons, a process for neutralizing these dusts and for recovering valuable metals therefrom is urgently required.

It has already been attempted to recycle the dusts to the same furnace which produced them. This allows iron to be recovered and oxides of nonferrous metals to be gradually concentrated in the fumes. But greater difficulties were soon experienced in the steelworks. In furnace charging and fumes collection, the energy consumptions increased, and the throughput of furnaces decreased. As a result, the method is regarded as not being desirable for economic and, above all, environmental, reasons.

At present, for processing EAF dusts use is made of several thermal processes in a reducing environment. These processes are carried out in rotary furnaces, hearth furnaces, plasma furnaces and flame furnaces.

The most widely known and used process is the Waelz-Berzelius process in which the dusts are mixed with fine coal, lime and silica and the resulting mixture is fed to a long rotary furnace.

The reduction takes place in that portion of the furnace in which temperatures of 1200° C. are reached: Zn and Pb turn into vapors and are recovered as dusts in condensers and in fumes filtrations units, whereas iron oxide, by reacting with the slagging agents, produces a slag which can not always be disposed of as an inert material.

Zn and Pb in Waelz oxides reach concentration levels of 60% and 10%, respectively. Therefore, this material is suitable for recovering both metals.

The HTR process, conceptually similar to the preceding one, achieves a certain energy saving by feeding the dust to that portion of the furnace in which temperatures of 1400° C. are reached. FeO is not reduced and turns into slag.

The plasmadust process (used in Sweden) uses a non-transferred arc plasma, causing a gas to flow through an electric arc discharge that is maintained between two electrodes installed inside the tuyeres of a metallurgical furnace which is top fed with coke flowing from top downwards. Pelletized dusts with coal and flux are injected into the flame of plasma torch. Iron oxides are reduced to cast iron, and Zn and Pb are reduced and volatilized, and are collected in an outer condenser. Lime and silica react with the other dust components, turning them into slag. At present, this process is mainly used for processing the dusts from electrical furnaces used to produce stainless steel.

The Inmetco process (used in the USA) is preferably used for processing the dusts from stainless steel producing electrical furnaces. Use is made of a rotary table furnace inside which the pelletized mixture of dust with coal and fine coke is submitted to a first reduction. Zn and Pb concentrate in the fumes from this furnace. The pre-reduced pellets, which contain all iron, are charged, together with scrap and rolling scales to a submersed arc electrical furnace to obtain an iron alloy with Cr. Ni and Mo contained in the original dusts.

A St. Joe reactor is a vertical steel furnace with a water jacket subdivided into two steps. The burner, is fed with coke powder and with oxygen enriched air, so a particularly high-temperature flame is generated (approximately at 2000° C.).

The metallurgical charge is pneumatically injected to the reducing region of the flame. Zn, Pb and Cd are reduced, vaporized, and collected in a sock filter.

The high-iron slag is granulated and can be sold to cement factories (in order to add iron to cement mixes), or is used as a raw material for blast furnaces.

The Tetronics process by British Steel Co. uses a transferred-arc plasma furnace. The plasma torch is installed on the furnace crown and, in order to distribute energy to the bath, it can rotate with a variable inclination relative to the vertical axis.

The fumes from stainless steel, mixed with 28% of anthracite, are continuously fed to the furnace (with a feed rate of 500 kg/h) at a constant temperature of about 2000° C. Cr, Ni and Mo are recovered as iron alloys.

The exhaust gases are deprived of dusts inside sock filters.

Also EAF dusts containing 18% of Zn were tested, with ZnO concentration up to 60% being obtained.

Also the Kaldo process for Boliden, developed for lead bearing residues, and the Slag Fuming process, very well-known for Zn and Pb recovery from silica slag from wind furnaces, can be regarded as representing possible solutions for EAF dusts processing.

In the vertical electrothermic furnace developed by St. Joe Minerals, studied for zinc minerals, EAF dusts may be charged, and sinter then mixed with the residue from blendes roasting.

The resulting sintered product flows then through a preheating rotary furnace and then enters the electrothermic furnace from the top. The coke feeds the furnace with energy and creates a conductive region for electrical energy supplied by means of graphite electrodes. Under the operating conditions of the furnace, Zn volatilizes. The fumes are sent to bubble through a cooled Zn bath which acts as a condenser. The feed should not contain less than 40% of Zn. The amount of EAF dusts which can be processed in this process is limited by the large amounts of impurities they contribute.

Finally, Michigan Technological University tried to add pellets of oxidized residues together with cast iron and scrap to a cupola furnace. By operating at 1510–1538° C., a slag is formed and iron is reduced and recovered in the liquid state, while Zn and Pb are volatilized and recovered as raw zinc oxide. It should be considered that pelletized oxides only represent 5% of the charge fed to the cupola furnace.

The facilities for performing the cited process require high investment costs and the resulting financial burdens are such that they can be supported only by primary steelworks or consortia.

The produced metals must be reprocessed in order to exploit them at a commercial level.

Only some from the above processes produce slags suitable for being disposed of in normal dumps.

BRIEF SUMMARY OF THE INVENTION

The purposes of the present invention are to supply a simple and direct process for:

recovering, in metal form iron contained in EAF dust;
separating and concentrating, without losses, Zn and Pb oxides and other either metal or non-metal impurities (Cd, F, Cl, and so forth);
removing all other components of dusts, sending them to form a slag suitable for being disposed of to normal dumps, i.e., with no toxic or noxious character.

According to the present invention, in order to achieve the above purposes, a facility should be used which is suitable for small to medium production rates and possibly known by those skilled in steel making industry.

The energy and operating costs limited and competitive with those of presently used processes for EAF dusts processing.

In order to achieve such purposes, the present invention proposes a process for processing the electric steelworks dusts and oxidized high-iron, zinc-bearing materials mainly in order to recover iron and zinc from them, characterized in that said dusts are fed to an induction furnace only partially filled with a charge of metal or alloy, as, usually, cast iron, to be smelted, such a charge being in the molten state as a bath under turbulent conditions inside said furnace owing to the effect of the induced currents, with said dusts thus coming into contact with the free surface of said turbulent molten bath inside said furnace, with reactions of reduction of zinc and iron oxides contained in said dusts consequently taking place inside said furnace.

The present invention is characterized, first of all, by the means selected to carry out the necessary reduction/oxidation reaction for rationally processing EAF dusts and oxidized zinc-bearing, high-iron materials, which are strongly penalized if the classic zinc production processes must be followed.

The low-frequency induction furnace of the coreless type, which was selected for practice of the present invention, has been known for many years in secondary steel and non-ferrous metals metallurgy as a fast and effective smelting means.

According to the known art, such a furnace is only used as a smelting means in which the charge in all known cases is constituted by cakes of oxides or scrap supplying high metal yields. This varies according to the metal or alloy to be smelted.

For example, in the case of cast iron production, a charge which can be regarded as being standard, is as follows:

| Clean cast iron cakes or scrap | 95% |
| Master alloys | 2–3% |
| Slagging agents | 1–2% |

According to the prior art, the low-frequency induction furnace is only used as a smelting means for preparing liquid metal for casting.

On the contrary, the present invention uses, for the first time, the low-frequency induction furnace not as a melting means, but as an apparatus for carrying out simultaneously reduction and oxidation reactions. It is therefore proposed to charge, for example, dust pellets typically having the following composition:

| ZnO | 16–24% |
| $Fe_2ZnO_4$ | 10–12% |
| FeO | 18–20% |
| MnO | 2–4% |
| PbO | 4–6% |
| CaO | 6–8% |
| $SiO_2$ | 4–5% |
| S | 0.5–1% |
| F | 0.5–1% |
| Cl | 0.5–2% | wherein all metals are in their oxidized forms.

This surprising application according to the present invention is made possible by the characterizing feature that the furnace, before the start of charging of the dust pellets, is filled up to approximately half height typically with cast iron, which constitutes the "heel" for the reaction. The high intensity flow of induced currents heats the bath up to 1450–1500° C. and keeps it vigorously stirred. Then, the pellets, preferably dry and pre-heated, are charged to the furnace mixed with 14% of granular coal, with small amounts of slagging agents added.

The reduction of the oxidized compounds to metal Zn takes place in the contact region between the surface of the cast iron bath and the lowermost, hottest layer of charged pellets. The continuous and fast renewal of the cast iron layer which wets the ZnO and FeZnO4 containing pellets, causes the following reaction with carbon contained in cast iron:

$$ZnO + C_{(Fe)} \rightarrow Zn + CO \qquad (1)$$

to proceed with a considerably high rate.

In its turn, the bath, owing to its contact with coal granules contained in the dust, restores the original C level of cast iron. Zn produced by reaction (1), owing to the high temperature of the reaction zone, vaporizes and rises through the layers of oxides of dust, effectively reducing iron oxides:

$$FeO + Zn \rightarrow Fe + ZnO \qquad (2).$$

The process takes place in two steps and in two different furnace zones:

a reductive step, in which the active agent is coal contained in cast iron, kept rapidly moving by the inductive phenomenon (steering). The interested zone is the bath/pellets contact region, which is the hottest region in the furnace and a large amount of energy must be supplied;

an oxidative step, which takes place inside the dusts, in which blended coal burns producing CO and generating the necessary energy to keep the high temperature value and to allow iron oxides to oxidize Zn vapors rising from bottom.

During the course of the process, the quality of formed slag must be carefully monitored, and, if necessary, possibly modified with a suitable flux to fluidize it. Also the volatilization of Pb must be suitably assisted, by adding small amounts of $CaCl_2$ in order to cause low-boiling $PbCl_2$ to be formed by the reaction of added calcium chloride with PbO.

A further object of the present invention is a facility for implementing the above disclosed process, which facility comprises an induction furnace for carrying out the process according to the present invention.

BRIEF DESCRIPTION OF THE SEVERAL VIEWS OF THE DRAWING

A facility according to the present invention is schematically illustrated in the sole FIGURE of the accompanying drawing.

DETAILED DESCRIPTION OF THE INVENTION

In the FIGURE, a low-frequency induction furnace (10) of coreless type is shown, inside which, a charge of molten cast iron (11) which only partially fills furnace (10). Charge (11) is consequently present as a molten bath under turbulent conditions inside the furnace owing to the effect of the high intensity induced currents typical of induction furnaces.

The dusts from electrical steelworks, rich in zinc and iron oxides, are fed to furnace (10) through an inlet (12), and they are thus obliged to flow along an inclined drum (13), in countercurrent relative to the flow of hot air leaving furnace (10). The reaction heat generated inside the furnace is thus used to dry and pre-heat the dusts while they are flowing towards furnace (10).

The oxides of non-ferrous metals leave the furnace entrained by the stream of hot gas rich in CO. The reaction of CO with the hood air:

$$CO + \tfrac{1}{2}O_2 \rightarrow CO_2 \qquad (3)$$

takes place during the passage of the fumes through inclined drum (13), along which the moist dust pellets which flow downwards, countercurrently relative to the fumes.

Upon leaving drum (13), the exhaust gases undergo a first cooling by the addition of air in a passage (14) and enter a cyclone (15) in which the coarsest and heaviest components are removed. The complete dust removal takes place inside a sock or bag filter (16) of "pulse-Jet" type, installed upstream from a chimney (17).

Non-limitative examples of a process according to the present invention are reported now.

EXAMPLE 1

By processing EAF dusts with normal composition (for example: dusts like the one described in following Example 2) according to the present invention, the following are obtained:

| | |
|---|---|
| 25–27% | Raw cast iron |
| 34–36% | Dusts recovered from fumes (Zn 50–60%) |
| 34–36% | Slag the composition of which, according to the international release test, falls within the limits of "A" Table of the test. |

Inside a low-frequency induction furnace of coreless type having a capacity of 900 l, 1 t/h of pelletized EAF dusts can be processed, with the following consumptions:

| | |
|---|---|
| Electrical power | 1000 kW/h |
| Coal | 130 kg |
| $CaCl_2$ | 4 kg |
| $CaF_2$ | 4 kg |
| $O_2$ | 130 m³ |
| $CH_4$ | 20 Nm³ |
| Refractory material | 6 kg |

The above consumptions include all subsidiary operations (fume filtration, granulation air, and so forth).

EXAMPLE 2

To a low-frequency furnace of coreless type with a power of 150 kW and with a capacity of 750 kg of cast iron, with refractory lining of alumina magnesite, 350 kg of cast iron was charged to be the reaction heel. The bath was heated up to 1450–1500° C. and then the dust feed was started. The dust feed consisted of 150 kg of dried and pre-heated pellets, and 20 kg of coal granules. The average composition of pelletized powders was:

Zn 21.5%; Pb 5.6%; Fe 27.4%; Mn 0.8%;

C 2.85%; Ca 3.30%; S 0.45%.

In order to fluidize the slag, 0.1 kg of $CaCl_2$ and 0.3 kg of $CaF_2$ were gradually added throughout the test duration.

In order to save electrical energy, 20 m³ of oxygen was injected.

Within one hour after the beginning of the test, the addition of the charge had been completed and the reaction had proceeded to its end, with a fluid slag of acidic type and with a glassy appearance being formed.

The complete analysis of the slag was as follows:

MgO 1.66%; CaO 14.43%; ZnO 1.98%; FeO 12.27%; PbO 0.05%; Al2O3 7.74%; balance $SiO_2$.

According to the release test, this slag meets the quality requirements of "A" Table.

From processing 150 kg of dusts, the following products were obtained:

38.5 kg of cast iron with 0.92% Mn, 3.6% C 52.5 kg of oxides with 58.3% Zn, 15.3% Pb, 0.44% Fe 53.0 kg of slag with 1.59% Zn, 0.05% Pb, 9.54% Fe.

Summing-up, the following aspects of the invention are worth being highlighted:

1) The choice of the induction furnace, which is very well-known as a smelting furnace, for carrying out reduction/oxidation reactions.
2) The intense agitation induced in the cast iron bath, so that the reduction of ZnO by alloyed carbon $ZnO + C_{(Fe)} \rightarrow Zn + CO$ is favored by the continuous renewal of the surface, caused by the intense induced currents flowing through the bath.
3) The reduction of FeO by Zn vapors evolving from the preceding reaction zone, multiplies the FeO reducing effect of coal contained in the charge.
4) The maximal energy exploitation of the available elements reduces the process consumptions.

What is claimed is:

1. A method for processing electric steelworks dusts containing oxidized high-iron, zinc-bearing materials to reduce iron and zinc from said dusts, comprising:

feeding said dusts to a reduction section of a coreless induction furnace, wherein said reduction section is partially filled with a charge of metal or alloy in the form of a molten bath made turbulent by induced currents; wherein said dusts contact a surface of said turbulent molten bath inside said furnace to reduce zinc and iron oxides contained in said dusts;

forming vapors containing zinc from said bath that rise above said bath;

oxidizing the zinc in said vapors.

2. Process according to claim 1, wherein said charge comprises cast iron and wherein said zinc oxide contained in said dusts reacts with carbon contained in said cast iron according to the following reaction:

$$ZnO + C_{(Fe)} \rightarrow Zn + CO \quad (1).$$

3. Process according to claim 2, wherein said metal zinc produced in reaction (1) vaporizes and reacts with iron oxide contained in said dusts according to the reaction:

$$FeO + Zn \rightarrow Fe + ZnO \quad (2).$$

4. The process of claim 2, further comprising mixing coal, in granular form, with said dust, to form a mixture; and contacting said molten cast iron with said mixture, thereby maintaining constant the carbon level of said molten cast iron.

5. Process according to claim 1, wherein said dusts are mixed with coal.

6. The process of claim 5, wherein said coal is in a granular form.

7. Process according to claim 1, wherein said dusts are fed to said furnace after being dried and pre-heated.

8. Process according to claim 1, wherein said iron and said zinc are recovered as cast iron and zinc oxide, respectively.

9. The process of claim 1, wherein said surface of said bath is a free surface.

10. The method of claim 1, wherein said vapors additionally contain carbon monoxide.

11. A method for processing electric steelworks dusts containing oxidized high-iron, zinc-bearing materials to reduce iron and zinc from said dusts, comprising:

feeding said dusts to a reduction section of a coreless induction furnace, wherein said reduction section is partially filled with a charge of metal or alloy in the form of a molten bath made turbulent by induced currents; wherein said dusts contact a surface of said turbulent molten bath inside said furnace to reduce zinc and iron oxides contained in said dusts;

forming vapors containing zinc from said bath that rise above said bath;

oxidizing the zinc in said vapors in an oxidation zone of the furnace, wherein the zinc in said vapors is oxidized by iron oxides.

* * * * *